US009801323B2

(12) United States Patent
Sudbrink et al.

(10) Patent No.: US 9,801,323 B2
(45) Date of Patent: Oct. 31, 2017

(54) ROCKER LINK LIFT SYSTEM

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

(*) Notice: Subject to any disclaimer, the term of this patent is extended or adjusted under 35 U.S.C. 154(b) by 82 days.

(21) Appl. No.: 14/537,206

(22) Filed: Nov. 10, 2014

(65) Prior Publication Data

US 2015/0129259 A1 May 14, 2015

Related U.S. Application Data

(60) Provisional application No. 61/903,429, filed on Nov. 13, 2013.

(51) Int. Cl.
*A01B 63/22* (2006.01)
*F16H 21/44* (2006.01)

(52) U.S. Cl.
CPC .............. *A01B 63/22* (2013.01); *F16H 21/44* (2013.01); *Y10T 74/20* (2015.01)

(58) Field of Classification Search
CPC ...................................................... A01B 63/22
(Continued)

(56) References Cited

U.S. PATENT DOCUMENTS 356,631 A * 1/1887 Frichette ................ A01B 63/22 172/400
1,136,043 A * 4/1915 Olson .................... A01B 63/14 172/238
(Continued)

FOREIGN PATENT DOCUMENTS

CA 2 289 240 A1 5/2000
FR 2 651 957 A1 3/1991
(Continued)

OTHER PUBLICATIONS

"Electro-hydraulic tillage depth control system for rotary implements mounted on agricultural tractor Design and response experiments of control system", Jeyong Lee, M. Yamazaki, A. Oida, H. Nakashima, H. Shimizu, Journal of Terramechanics 35, 1998, pp. 229-238 (10 pages).

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A lift system for an implement has the lift cylinder near the implement front end. A rocker link with three vertically spaced pivot holes is located rearward of the cylinder and connected to an implement frame by a pivot pin through the center one of the holes. The lift cylinder is connected to the lower pivot hole while two further links are connected to the top hole and extend longitudinally away from one another to control raising and lowering of front and rear wheels respectively. As the cylinder extends and retracts, the rocker pivots causing the front and rear wheels to raise and lower in synchronism with each other. Fore and aft leveling adjustment may be achieved by including a turnbuckle in one of the further links to vary the length thereof relative to the other.

12 Claims, 4 Drawing Sheets

(58) Field of Classification Search
USPC .......................................................... 172/400
See application file for complete search history.

(56) References Cited

U.S. PATENT DOCUMENTS 1,412,950 A * 4/1922 McCoy ................ A01B 49/027 172/400
3,091,476 A * 5/1963 Blake ................... B60G 17/033 172/413
3,700,041 A 10/1972 Ryan
3,777,823 A * 12/1973 Holfeld .................. A01B 63/22 172/328
3,908,345 A 9/1975 Oni et al.
4,026,365 A 5/1977 Andersson et al.
4,119,329 A 10/1978 Smith
4,176,721 A 12/1979 Poggemiller et al.
4,273,196 A 6/1981 Etsusaki et al.
4,301,871 A 11/1981 van der Lely et al.
4,317,489 A 3/1982 Steinbach
4,355,688 A 10/1982 Hamm et al.
4,359,105 A 11/1982 Van Natta
4,600,060 A 7/1986 Winter et al.
4,655,296 A * 4/1987 Bourgault .............. A01B 63/22 172/400
4,878,543 A 11/1989 Kauss
4,944,355 A 7/1990 Karchewski
5,009,270 A 4/1991 Vangsgard
5,234,060 A 8/1993 Carter
5,409,069 A * 4/1995 Hake ...................... A01B 63/22 172/328
5,427,184 A 6/1995 Peck
5,538,266 A 7/1996 Martin et al.
5,562,167 A 10/1996 Honey
5,573,072 A 11/1996 Evans et al.
5,660,237 A 8/1997 Boyko et al.
5,771,978 A 6/1998 Davidson et al.
5,957,218 A 9/1999 Noonan et al.
6,089,327 A 7/2000 Kimura et al.
6,112,145 A 8/2000 Zachman
6,112,827 A 9/2000 Reiber et al.
6,144,910 A 11/2000 Scarlett et al.
6,220,366 B1 4/2001 Noonan et al.
6,305,478 B1 10/2001 Friggstad
6,367,589 B1 4/2002 Lausch et al.
6,374,921 B1 4/2002 Friggstad
6,397,953 B1 * 6/2002 Ankenman ............ A01B 51/04 172/445.1
6,401,832 B1 * 6/2002 Payne .................... A01B 63/22 172/238
6,547,012 B2 4/2003 Scarlett et al.
6,786,130 B2 9/2004 Steinlage et al.
6,935,253 B2 8/2005 Murray et al.
7,142,956 B2 11/2006 Heiniger et al.
7,588,088 B2 9/2009 Zachman
7,766,093 B2 8/2010 Becker et al.
7,970,519 B2 6/2011 Green
8,235,133 B2 8/2012 Friggstad
8,352,121 B2 1/2013 Bitter
8,359,988 B2 1/2013 Bassett
2004/0016556 A1 1/2004 Barber
2006/0021235 A1 2/2006 Becker
2007/0068238 A1 3/2007 Wendte
2008/0267719 A1 10/2008 Corcoran
2012/0048159 A1 3/2012 Adams et al.
2012/0048160 A1 3/2012 Adams et al.
2012/0215410 A1 8/2012 Mcclure et al.
2012/0227992 A1 9/2012 Henry
2012/0261145 A1 * 10/2012 Palen ..................... A01B 63/22 172/1
2012/0261146 A1 10/2012 Bolten
2012/0305321 A1 12/2012 Wagger
2013/0032363 A1 2/2013 Curry et al.

FOREIGN PATENT DOCUMENTS

GB 833670 4/1960
JP 3087102 A 4/1991
JP 9313010 A 12/1997
JP 2000-270603 A 10/2000
WO 03/000028 A1 1/2003
WO 2013/026661 A1 2/2013

* cited by examiner 76
60
82
58
56
62
50
52
26
36
46
44
48
34
20
22
28
32
30
84
78
72
68
80
66
64
74
70
24

ROCKER LINK LIFT SYSTEM

CROSS REFERENCE TO RELATED APPLICATIONS

This is a non-provisional application based upon U.S. provisional patent application Ser. No. 61/903,429, entitled "ROCKER LINK LIFT SYSTEM", filed Nov. 13, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

It is not an uncommon sight to see a farm tractor pulling cultivating or planting implements along rural roads. Field cultivating implements such as harrows include, in addition to the actual soil working tools such as harrow tines or discs, a set of wheels which are deployed when moving an implement between storage locations and one or more work locations eliminating the need for a separate implement transporting trailer. This same set of wheels may be employed to engage the farm field surface and control the depth or penetration of the soil working tools into the earth. A fixed wheel location would probably result in tool and/or roadway damage. Thus, various schemes for retracting and extending the wheels relative to the implement have been suggested. These schemes allow full wheel extension when transporting the implement and a controllable limited extension when cultivating. The wheels allow the implement to more nearly follow field contours. These schemes have the additional advantage that the depth of working tool penetration into the soil may be controlled for preferred tillage.

The known wheel retracting techniques employ one or more lift cylinders typically located at or near the rear of the implement, with mechanical linkages from the cylinders to respective wheels. Their weight undesirably adds weight to the implement behind the wheel pivots detrimentally affecting tongue weight.

What is needed in the art is a simple, fully adjustable wheel retracting scheme which shifts the weight forward on the implement.

SUMMARY OF THE INVENTION

The present invention provides improved weight distribution in a fully adjustable agricultural implement wheel retracting arrangement.

The invention in one form is directed to an agricultural tillage implement, having a main frame section including a plurality of generally downwardly depending soil working tools. The frame section is adapted to be coupled by a floating hitch arrangement to and towed by a traction unit in a generally horizontal forward direction of travel. There is a first plurality of lift wheels pivotably depending from the frame section, and a second plurality of gauge wheels pivotably depending from the frame section generally forward of the lift wheels. A linkage assembly simultaneously pivots certain gauge and lift wheels between respective retracted and extended positions for selectively lowering and raising the main frame section and associated soil working tools. The linkage assembly has an actuator pivotably fixed to the main frame section along with a rocker link pivotably fixed to the main frame section having first and second arms extending therefrom, the first of which is coupled to the actuator. A rearwardly extending lift wheel actuating link is pivotably fixed to the rocker link second arm near one end and coupled to a lift wheel near another end. A forwardly extending gauge wheel actuating link is also pivotably fixed to the rocker link second arm near one end and coupled to a gauge wheel near another end. One of the actuating links is adjustable in length. The actuator is fixed to the frame reward of the gauge wheels and forward of the rocker link.

The invention in another form is directed to a linkage assembly for use with an agricultural implement which is adapted to simultaneously pivot certain front and rear wheels between respective retracted and extended positions for selectively lowering and raising the implement frame and any associated soil working tools. The linkage assembly has an actuator and a rocker link both pivotably fixed to the implement frame. The rocker link has a first arm extending therefrom coupled to the actuator, and a second arm extending therefrom coupled to a rearwardly extending wheel actuating link which is in turn coupled to a rear wheel near another end. A forwardly extending wheel actuating link is also pivotably fixed to the rocker link second arm near one end and coupled to a front wheel near another end. The actuator may be a linear hydraulic actuator operable between extended and retracted positions which extends from the frame to the rocker link first arm.

An advantage of the present invention is that the implement center of gravity is shifted forward as compared to typical designs.

Another advantage is full lateral as well as longitudinal leveling features may be incorporated.

Yet another advantage is simplicity of design.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
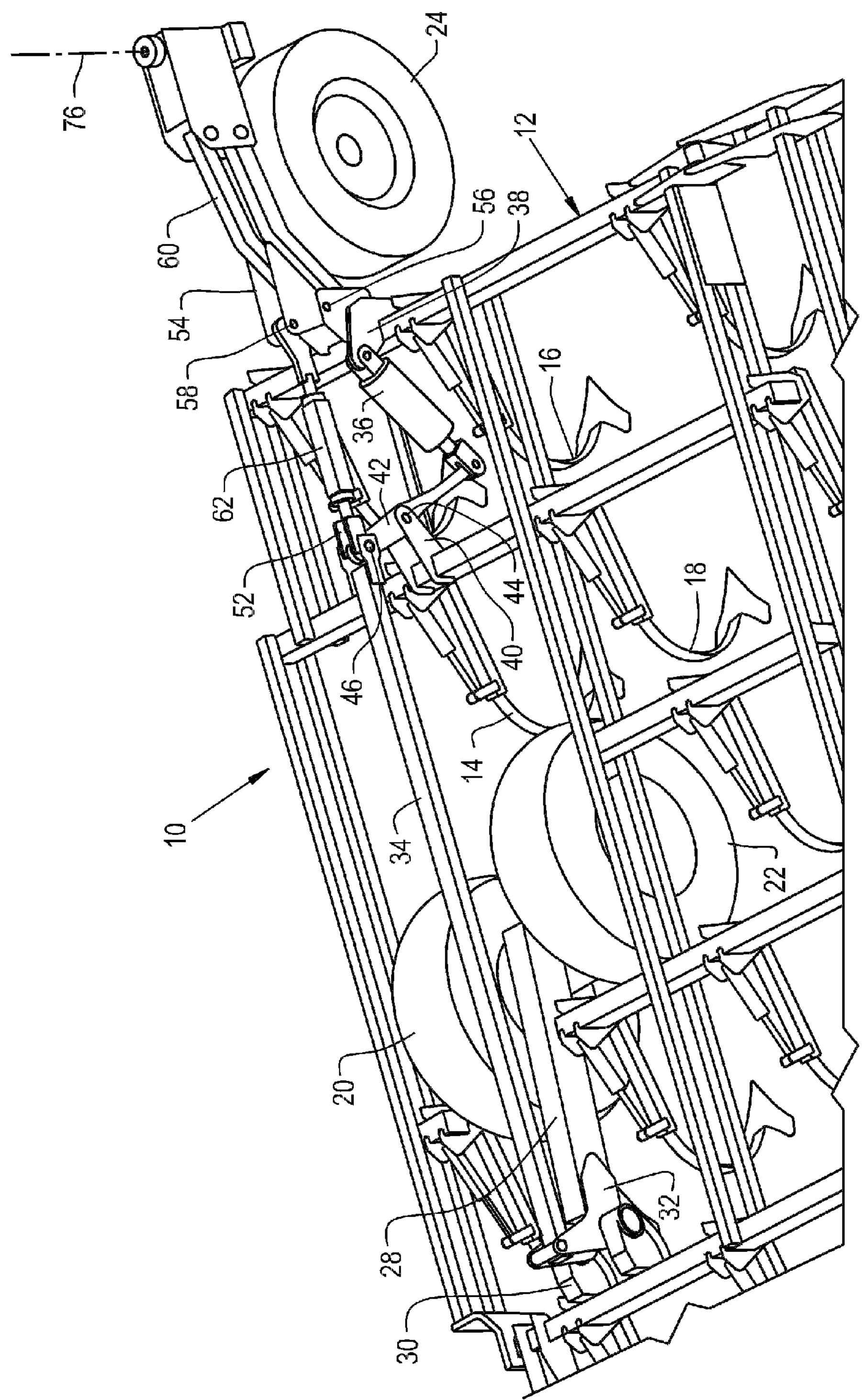
FIG. 1 is an isometric view of a portion of an agricultural tillage implement incorporating the invention in one form showing wheels in a retracted position.
Figure 2:
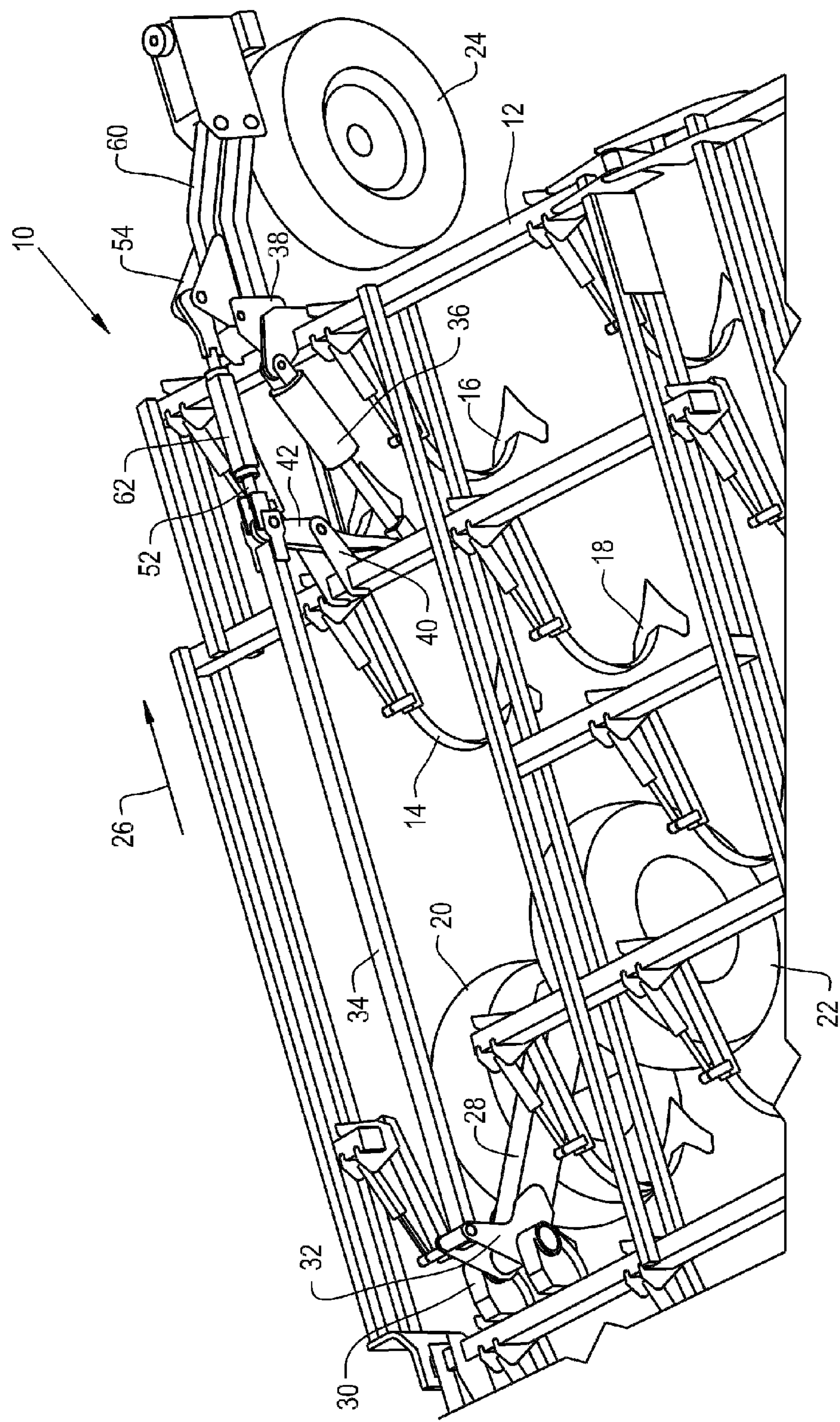
FIG. 2 is an isometric view of the portion of the agricultural tillage implement of FIG. 1, but showing the wheels in a lowered position.
Figure 3:
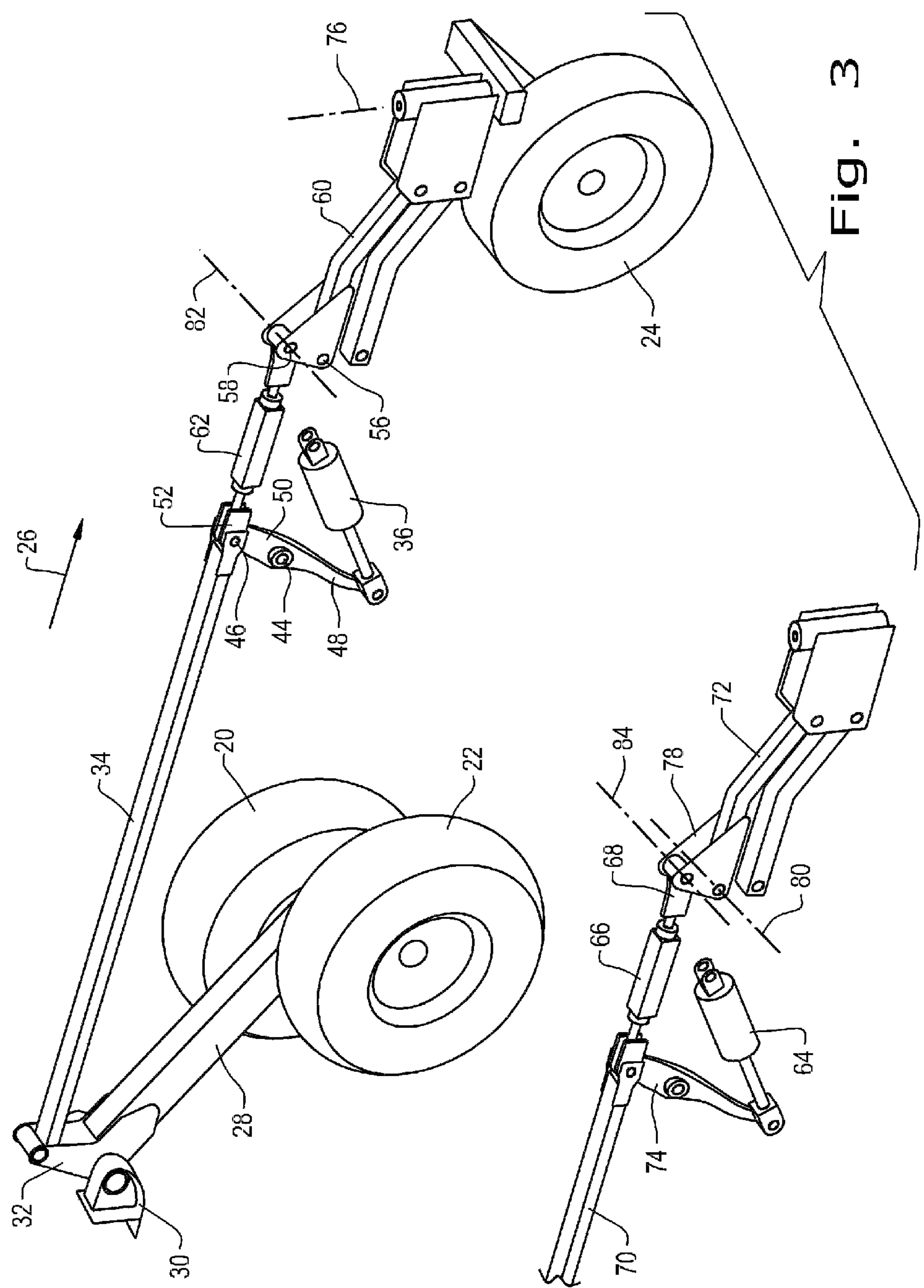
FIG. 3 is an isometric view of the wheel lift linkage assembly portion of FIG. 2 from a different perspective.

Referring now to the drawings, and more particularly to FIG. 1, there is shown a portion of an agricultural tillage implement 10 which generally includes a main frame section 12 and, depending therefrom, an array of downwardly extending soil working tools such as the harrow tines 14, 16 and 18, a set of rear lift wheels 20 and 22, and a front gauge wheel 24. Gauge wheel 24 may be a castor type wheel having a vertical axis of rotation 76 in some embodiments. The frame section 12 is adapted to be coupled by a conventional floating hitch arrangement (not shown) and towed by a traction unit in a generally horizontal forward direction of travel indicated by the arrow 26 (FIGS. 2 and 3).

Referring to the drawings generally, the rear wheels 20 and 22, frequently called lift wheels, depend from the frame 12 on an arm 28 which is pivotably fixed to the bracket 30 by knuckle 32. Bracket 30 is rigidly fixed to the implement main frame section 12. A rear lift wheel link 34 is similarly pivotably fixed to the knuckle 32 so that translation of link 34 serves to raise and lower the wheels 20 and 22. Thus, if link 34 moves generally leftward as viewed, knuckle 32 pivots counter-clockwise within the bracket 30 raising the wheels from the position illustrated in FIGS. 2 and 3 to the position shown in FIG. 1.

Translation of link 34 is achieved by extending or retracting an actuator or lift cylinder 36. The actuator 36 may comprise a linearly extendable and retractable piston within a hydraulic cylinder and is pivotably fixed to the main frame section 12 by rigid bracket 38. Located rearwardly thereof is a somewhat similar rigid bracket 40 which pivotably supports a rocker link 42. This rocker link may be more clearly seen in FIG. 3 and includes three spaced apart apertures the central one of which is affixed by a pivot pin 44 to bracket 40. The rocker link 42 includes a downwardly depending or lower arm 48. The hole near the lower end of rocker link arm 48 is pivotably fixed to the lower end of the actuator 36 while an upper arm 50 of rocker link 42 has the upper end hole which pivotably engages the rear wheel link 34 at pivot pin 46. Thus, when the lift cylinder 36 is extended, rocker arm 50 pivots about pin 44 in a clockwise sense as viewed, drawing arm 34 generally to the right and lowering wheels 20 and 22, compare FIGS. 1 and 2.

Pivot pin 46 defines a common pivot axis which is shared by the rocker link upper arm 50, the rearwardly extending lift wheel link 34 and a forwardly extending gauge wheel actuating link 52. Link 52 is pivotably coupled to the gauge wheel 24 by a knuckle 54. The knuckle 54 has a pivot axis defined by pin 56 which is fixed relative to the frame 12. A second pivot pin 58 defining pivot axis 82 is displaced from pin 56 and receives the actuating link 52. An arm 60 extends from the knuckle 54 to wheel 24.

Front-to-rear leveling of the implement may be achieved by adjusting the length of the forward wheel actuating link 52 relative to the length of link 34 by including an adjustable length turnbuckle 62. By including a similar adjustable lug in the lift cylinder coupling, left-to right leveling may be achieved. Independent control of lift cylinders such as 36 and 64 may also be employed in achieving left-to-right implement leveling.

It will be appreciated that only a portion of the implement (the left front as viewed from above and behind in FIGS. 1 and 2) is shown, and that an essentially mirror image of the portion shown will be present on the opposite side of the implement, fragments of which are visible in FIG. 3, and that further similar intermediate wheels and linkage assemblies may be present in some applications. For example, FIG. 3 shows another lift cylinder 64 analogous to cylinder 36, and another turnbuckle 66 in the forward gauge wheel link 68. Also visible in FIG. 3 are a rear lift wheel link 70, front wheel arm 72, rocker link 74 and front knuckle 78. Knuckle 78 receives pins defining a first fixed pivot axis 80 analogous to the axis defined by pin 56 and a second actuating link pivot axis 84 displaced therefrom and analogous to axis 82, all operating as previously described.

Figure 4:
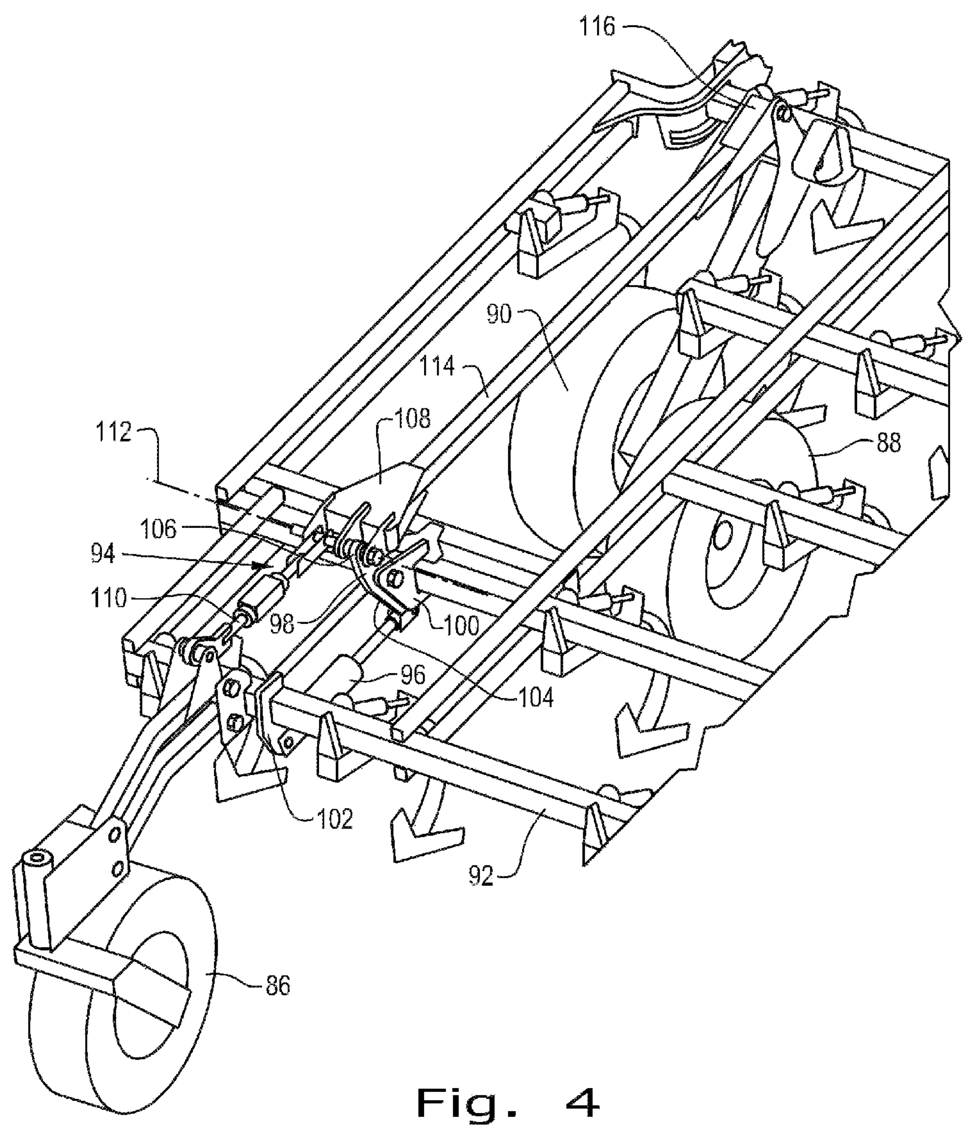
FIG. 4 is an isometric view of a portion of an agricultural tillage implement incorporating the invention in another form.

FIG. 4 illustrates another embodiment of the invention viewed in a different orientation. Here, the right front gauge wheel 86 along with rear lift wheels 88 and 90 are visible as viewed from the front of the implement. Implement frame 92 supports the linkage assembly 94. The linkage assembly includes hydraulic actuator 96 and rocker link 98 which is pivotably fixed to the frame 92 by the rigid rocker link bracket 100. The hydraulic cylinder 96 is pivotably fixed to frame 92 by rigid cylinder bracket 102 near one end and to a first or lower rocker arm 104 of the rocker link 98 near the other end. A clevis-like coupling 108 receives the upper rocker arm 106 and forward gauge wheel actuating link 110 along a common pivot axis 112. A rear lift wheel link 114 extends toward the rear of the implement from coupling 108 to rear knuckle 116. The linkage assembly of FIG. 4 functions to simultaneously pivot certain front and rear wheels between respective retracted and extended positions as described earlier in conjunction with FIGS. 1-3.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:

a main frame section including a plurality of generally downwardly extending soil working tools, the main frame section adapted to be coupled by a floating hitch arrangement to and towed by a traction unit in a generally horizontal forward direction of travel;

a lift wheel pivotably supported with respect to the main frame section at a first pivot location;

a gauge wheel pivotably supported with respect to the main frame section at a second pivot location generally forward of the lift wheel; and a linkage assembly for simultaneously pivoting the gauge and lift wheels between respective retracted and extended positions for selectively lowering and raising the main frame section and associated soil working tools, the linkage assembly including:

an actuator pivotably connected to the main frame section;

a rocker link pivotably connected to the main frame section having a rocker link first arm extending below the main frame section and having a rocker link first arm lower end coupled to the actuator below the main frame section, and a rocker link second arm extending above the main frame section and having a rocker link second arm upper end;

a rearwardly extending lift wheel actuating link having a lift wheel actuating link inner end and a lift wheel actuating link outer end, wherein the lift wheel actuating link inner end is pivotably connected to the rocker link second arm upper end above the main frame section and wherein the lift wheel actuating link outer end is arranged toward the lift wheel; and a forwardly extending gauge wheel actuating link having a gauge wheel actuating link inner end and a gauge wheel actuating link outer end, wherein the gauge wheel actuating link inner end is pivotably connected to the rocker link second arm upper end above the main frame section and wherein the gauge wheel actuating link outer end is arranged toward the gauge wheel, wherein actuation of the actuator moves the rocker link first arm lower end below the main frame section in a first direction and moves the rocker link second arm upper end in a second, opposite, direction to move the inner ends of the lift wheel and gauge wheel actuating links above the main frame section.

2. The agricultural tillage implement of claim 1, wherein the actuator is connected to the main frame section rearward of the gauge wheels and forward of the rocker link.

3. The agricultural tillage implement of claim 1, wherein one of the lift wheel actuating link and gauge wheel actuating link is selectively adjustable in length.

4. The agricultural tillage implement of claim 3, wherein the gauge wheel actuating link is defined by an adjustable length link with two link portions and a turnbuckle coupling the two link portions together.

5. The agricultural tillage implement of claim 1, wherein the actuator comprises a linear hydraulic actuator operable between extended and retracted positions extending rearwardly from the main frame section to the rocker link first arm.

6. The agricultural tillage implement of claim 1, wherein the gauge wheel actuating link is pivotably coupled to the gauge wheel by a knuckle having a first pivot axis positioned relative to the main frame section and a second pivot axis displaced from the first axis, and an arm extending from the knuckle to the gauge wheel.

7. The agricultural tillage implement of claim 1, wherein the lift wheel actuating link and the gauge wheel actuating link are pivotably connected to the rocker link second arm along a common pivot axis.

8. A linkage assembly for use with an agricultural implement having a frame towed by a traction unit in a generally horizontal forward direction of travel and a front wheel and a rear wheel that are longitudinally spaced from each other relative to the frame of the agricultural implement, wherein the linkage assembly is adapted to simultaneously pivot the front and rear wheels between respective retracted and extended positions for selectively lowering and raising the frame and any associated soil working tools, the linkage assembly comprising:

an actuator pivotably connected to the frame;

a rocker link pivotably connected to the frame having a rocker link first arm extending therefrom and having a rocker link first arm lower end arranged below the frame and coupled to the actuator, and a rocker link second arm extending therefrom and having a rocker link second arm upper end arranged above the frame;

a rearwardly extending rear wheel actuating link with a rear wheel actuating link inner end and a rear wheel actuating link outer end, wherein the rear wheel actuating link inner end is pivotably connected to the rocker link second arm upper end; and a forwardly extending front wheel actuating link with a front wheel actuating link inner end and a front wheel actuating link outer end, wherein the front wheel actuating link inner end is pivotably connected to the rocker link second arm upper end, wherein one of the rear wheel actuating link and front wheel actuating link is selectively adjustable in length, and wherein the front wheel actuating link is defined by an adjustable length link with two link portions and a turnbuckle coupling the two link portions together.

9. The linkage assembly of claim 8, wherein the actuator is connected to the frame rearward of the front wheel and forward of the rocker link.

10. The linkage assembly of claim 8, wherein the actuator comprises a linear hydraulic actuator extending rearwardly from the frame to the rocker link first arm, said actuator operable between extended and retracted positions.

11. The linkage assembly of claim 8, wherein the front wheel actuating link is pivotably coupled to the front wheel by a knuckle having a first pivot axis positioned relative to the frame and a second pivot axis displaced from the first axis, and an arm extending from the knuckle to the front wheel.

12. The linkage assembly of claim 8, wherein the front wheel actuating link and the rear wheel actuating link are pivotably connected to the rocker link second arm along a common pivot axis.

* * * * *